United States Patent
Klaghofer et al.

(10) Patent No.: US 6,442,268 B1
(45) Date of Patent: Aug. 27, 2002

(54) METHOD OF IMPLEMENTING A LINE GROUP FUNCTION IN A COMMUNICATIONS NETWORK BASED ON ITU-T H.323

(75) Inventors: Karl Klaghofer, München; Markku Korpi, Starnberg, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/469,085

(22) Filed: Dec. 21, 1999

(30) Foreign Application Priority Data

Dec. 21, 1998 (DE) .......................................... 198 59 150

(51) Int. Cl.[7] .......................... H04M 1/64; H04M 3/42; H04M 3/523; H04M 7/00; H04J 3/12
(52) U.S. Cl. ........................ 379/229; 370/259; 370/384; 370/522; 379/88.26; 379/211.02; 379/230; 379/265.02; 379/265.09; 379/908
(58) Field of Search ................................. 370/259, 351, 370/352, 384, 385, 401, 466, 467, 522; 379/88.26, 201.01, 207.02, 211.02, 212.01, 225, 229, 230, 240, 265.02, 265.09, 908

(56) References Cited

U.S. PATENT DOCUMENTS

| | | | | |
|---|---|---|---|---|
| 5,467,389 A | * | 11/1995 | Endo et al. | 379/211.02 |
| 5,479,496 A | * | 12/1995 | Endo et al. | 379/212.01 |
| 5,764,750 A | * | 6/1998 | Chau et al. | 370/467 |
| 5,867,494 A | * | 2/1999 | Krishnaswamy et al. | 370/352 |
| 5,867,495 A | * | 2/1999 | Elliott et al. | 370/352 |
| 5,999,525 A | * | 12/1999 | Krishnaswamy et al. | 370/352 |
| 5,999,965 A | * | 12/1999 | Kelly | 709/202 |
| 6,011,844 A | * | 1/2000 | Uppaluru et al. | 379/219 |
| 6,275,490 B1 | * | 8/2001 | Mattaway et al. | 370/352 |
| 6,324,276 B1 | * | 11/2001 | Uppaluru et al. | 379/211.02 |
| 6,335,927 B1 | * | 1/2002 | Elliott et al. | 370/352 |

OTHER PUBLICATIONS

"ITU–T Series H: Audiovisual and Multimedia Systems", Feb. 1998, pp. 1–114.

* cited by examiner

*Primary Examiner*—Harry S. Hong
(74) *Attorney, Agent, or Firm*—Laurence A. Greenberg; Werner H. Stemer; Ralph E. Locher

(57) ABSTRACT

A line group function in a communications network based on ITU-T H.323 is implemented via a proxy function. First, an alias address for the line group is converted into a group transport address for a proxy function, and a connection setup message is transmitted from the calling endpoint to the proxy function using the group transport address. A connection setup message is transmitted from the proxy function to group endpoints in the line group using transport addresses known to the proxy function. After a response message has been transmitted from one of the group endpoints to the proxy function, the address of this endpoint is transmitted to the calling endpoint, and the address of the calling endpoint is transmitted to the responding group endpoint by the proxy function. A connection is set up between the calling endpoint and the responding group endpoint using the addresses of these endpoints.

6 Claims, 2 Drawing Sheets

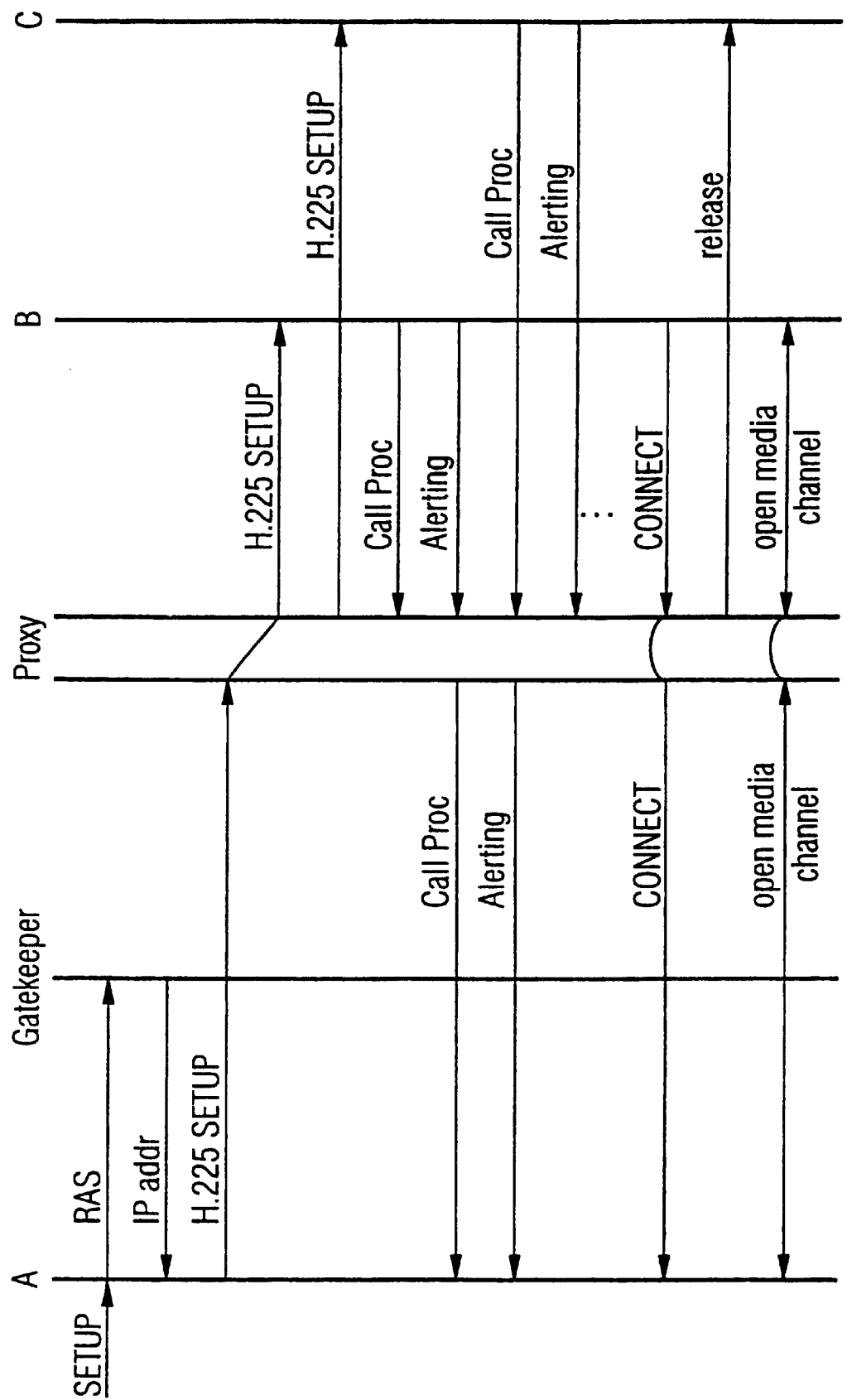

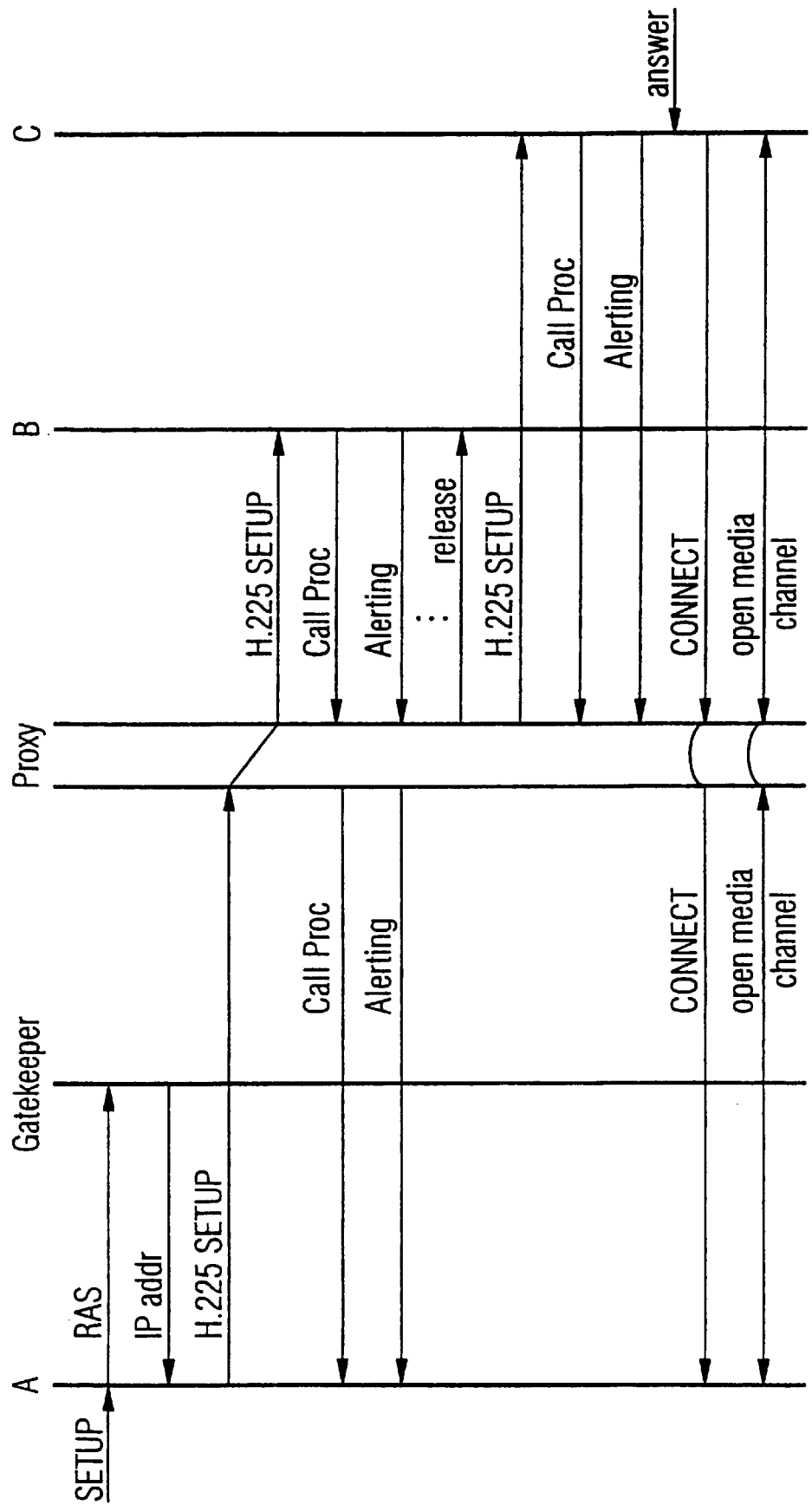

METHOD OF IMPLEMENTING A LINE GROUP FUNCTION IN A COMMUNICATIONS NETWORK BASED ON ITU-T H.323

BACKGROUND OF THE INVENTION

Field of the Invention

The invention lies in the telecommunications field. More specifically, the invention relates to a method of implementing a line group function in a communications network based on ITU-T Standard H.323. In this context, line group signifies that a group address is called from a calling terminal in order to prompt a connection to be set up to one of a plurality of group terminals in a line group.

Line group functions are known from centrally controlled communication private branch exchanges. In such communication private branch exchanges, there is a central switching device which undertakes the signaling for the individual group endpoints in a line group and also switches the call set-up for the connections between a group endpoint and a calling endpoint.

Depending on the distribution of signaling by a central communication controller to the individual group endpoints, three fundamental line group types are distinguished. If a call directed from a calling endpoint to the group address is signaled to all group endpoints simultaneously, then a "pickup" group function is involved. If the incoming call is signaled to a single group endpoint and respectively signaled to the next endpoint if this group endpoint does not respond within a particular time period, a "hunting" group function is involved. If a call directed to a group address is signaled specifically to a group endpoint by the central controller on the basis of an automatic call distribution function, this is called Automatic Call Distribution ACD.

In a communications network based on ITU-T Standard H.323, in which there is no central call control but instead call control from endpoint to endpoint, it is not possible to implement a line group function in correspondence with the known centrally switched communications systems.

SUMMARY OF THE INVENTION

It is accordingly an object of the invention to provide a novel method which overcomes the above-mentioned disadvantages of the heretofore-known devices and methods of this general type and which enables the implementation of a line group function in a communications network based on ITU-T H.323.

With the foregoing and other objects in view there is provided, in accordance with the invention, a method of implementing a line group function in a communications network based on ITU-T Standard H.323, whereby a calling endpoint calls a group address to prompt a connection to be set up to one of a plurality of group endpoints in a line group. The novel method comprises the following method steps:

converting an alias address for the line group into a group transport address for a proxy function, and transmitting a connection setup message from the calling endpoint to the proxy function using the group transport address;

transmitting a connection setup message from the proxy function to group endpoints in the line group using transport addresses known to the proxy function;

transmitting a response message from a responding group endpoint to the proxy function, and subsequently transmitting the address of the responding group endpoint to the calling endpoint, and transmitting the address of the calling endpoint to the responding group endpoint by the proxy function; and setting up a connection between the calling endpoint and the responding group endpoint using the addresses of the calling endpoint and the responding group endpoint.

The use of a proxy function as a controller for a line group function ensures that the line group function can be carried out irrespective of the state of the individual group endpoints. The setting-up of connections between endpoints in a communications network based on ITU-T H.323 is controlled by the endpoints. If a terminal at an endpoint is not ready, an attempt to set up a connection to that terminal would have no effect without a proxy function. The proxy function, which is independent of terminals, thus ensures that the line group function is implemented even if terminals at individual group endpoints are not ready.

In a similar way to a gatekeeper function, a proxy function is a logic function within a communications network. A gatekeeper is a logic function for performing standard functions such as address resolution or bandwidth management. In this context, address resolution means that a calling endpoint transmits to the gatekeeper an alias address for an endpoint which is to be called, and receives from the gatekeeper the transport address, that is to say the Internet protocol address and the port number. The gatekeeper knows the volume of traffic for real-time applications within the network area for which it is responsible. When a calling terminal transmits a request for a connection with a particular bandwidth to the gatekeeper, the gatekeeper compares the requested bandwidth with the available bandwidth and, depending on the result of the comparison, transmits a message to the calling terminal.

A proxy is also a logic function. A proxy according to the invention knows the transport addresses of all the members of a line group for which the proxy can be contacted via a group address, a so-called pilot address. When a call for this group address comes to the proxy, the proxy attempts to set up a connection to one of the line group endpoints on the basis of a stipulated regulation using the transport addresses of the group endpoints of the members of the line group.

In accordance with an added feature of the invention, the proxy function signals to the calling endpoint that a connection setup message is being transmitted to the group endpoints. In other words, the proxy function signals to the calling terminal that it is transmitting a connection setup message to a group endpoint. This allows a subscriber at the calling endpoint to recognize that a connection setup operation is not yet complete but has not been terminated either.

In accordance with an additional feature of the invention, the proxy function transmits a connection setup message simultaneously to all group endpoints and transmits to the calling endpoint the address of the group endpoint from which the proxy function receives a first response message, which signals readiness to receive. This embodiment of the invention implements a pickup-group line group function.

In accordance with another feature of the invention, the proxy function transmits a connection setup message to one of the group endpoints and, if no response message (ready to receive) has been transmitted to the proxy function from the one group endpoint within a predetermined time period, the proxy function transmits a connection setup message to another of the group endpoints until one of the group endpoints transmits a response message. This embodiment of the invention allows implementing a hunting-group line group function. The hunting is continued either until one of the group endpoints transmits a response message or until a stipulated maximum time period has expired.

Although such a way of implementing a hunting function may result in relatively long waiting times for a calling subscriber, it reduces the volume of traffic within the communications network.

Both the method just described for implementing a hunting-group line group function and the previously described method for implementing a pickup-group line group function can also be used to contact, via a single group address, a subscriber who may be contactable via a plurality of different endpoints. In this case, all the group endpoints in the respective line group are allocated to the same subscriber.

In accordance with a further feature of the invention, one of the group endpoints is a message recording device, and the step of transmitting a connection setup message with the proxy function comprises transmitting the connection setup message to the device for recording messages last.

In this implementation of a hunting-group line group function, one of the group endpoints is allocated a message recording device, and the proxy function transmits a connection setup message to this group endpoint only if all the other group endpoints have not set up a connection. Such a method enables a calling subscriber to leave a message, both in the case of a line group having different subscribers and in the case of a line group whose group endpoints are all allocated to one subscriber.

In accordance with a concomitant feature of the invention, the proxy function defines a sequence in which connection setup messages are to be transmitted to the individual group endpoints on the basis of a regulation for automatic call distribution. In this implementation of the hunting-group line group function, the proxy function defines the sequence in which connection setup messages are transmitted to individual group endpoints on the basis of a regulation for automatic call distribution. This regulation can, for example, be designed to optimize the timing of the utilization of the individual group endpoints. However, the regulation for call distribution can also be based on the instant when a call was last ended.

Of course, the individual group endpoints can possibly also be contactable via alias addresses which are independent of the group address. To contact such a group endpoint via the alias address, which is independent of the group address, the alias address can in this case be resolved by a gatekeeper function, for example. Accordingly, such a gatekeeper function transmits the transport address of the specifically called group endpoint to the calling endpoint.

Other features which are considered as characteristic for the invention are set forth in the appended claims.

Although the invention is illustrated and described herein as embodied in a method of implementing a line group function in a communications network based on ITU-T H.323, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic message flowchart for implementing a pickup-group line group in a communications network based on ITU-T Standard H.323 illustrating an embodiment of a method according to the invention; and FIG. 2 is a schematic message flowchart for implementing a hunting-group line group in a communications network based on ITU-T Standard H.323 illustrating an embodiment of a method according to the invention.

DESCRIPTION OF THE PREFERRED EMBODIMENTS

FIGS. 1 and 2 each show basic states, events and the message flow between three endpoints A, B and C in a communications network based on ITU-T Standard H.323 and a proxy function provided in this communications network. In the initial state, the proxy function Proxy and non-illustrated terminals that are allocated to the endpoints A, B and C are each in an inactive state.

In the sequence of events shown in FIG. 1 for implementing a pickup-group line group, and also in the sequence of events shown in FIG. 2 for implementing a hunting-group line group, a subscriber at the endpoint A uses the proxy function Proxy to prompt a connection to be set up to a line group of endpoints B and C. For this, an RAS message is transmitted from the endpoint A to the gatekeeper responsible for the endpoint A. The acronym RAS stands for registration, administration and status and is equivalent to a protocol between the endpoint and the gatekeeper. In the embodiments in FIGS. 1 and 2, the corresponding sequence of events is shown in a simplified illustration. Usually, the endpoint A sends a request for access authorization in the form of an RAS message AdmissionRequest to the gatekeeper with an alias address for the line group B, C which is to be called. The gatekeeper, as a logic function, checks the authorization of the calling endpoint A and transmits an RAS message AdmissionConfirm to the endpoint A to acknowledge access authorization. In this case, the endpoint A receives from the gatekeeper an address for the line group to be called in the form of a group transport address for a proxy function Proxy as a routable alias address for this imaginary endpoint.

The endpoint A transmits a connection setup message H.225 SETUP containing the group transport address of the line group to be called to the proxy function Proxy. Such a group transport address for a line group is also called a pilot address. The proxy function Proxy recognizes that it must take the addresses of the actual endpoints B and C from a table assigned to the group transport address in order to send a message H.225 SETUP to these actual endpoints B and C.

In the sequence of events shown in FIG. 1 for implementing a pickup-group line group, the message H.225 SETUP is forwarded by the proxy function Proxy to the endpoint B and to the endpoint C simultaneously. The endpoint B and the endpoint C acknowledge to the proxy function Proxy that dialing is complete with a message CallProc, and that an incoming call has been recognized with a message Alerting. The proxy function transmits these messages CallProc and Alerting to the calling endpoint A only once, however, in response to the first corresponding message received.

If, as is assumed in the embodiment, shown in FIG. 1, of a sequence of events for implementing a pickup-group line group, a subscriber or an automated device at the endpoint B wants to take the call signaled by the endpoint A, a response message CONNECT (as per ITU-T H.225) is transmitted to the endpoint A from the endpoint B via the proxy function Proxy. A procedure for opening logical channels between the endpoints A and B is then initiated. In this case, the opening of logical channels can either be prepared by the actual SETUP message and concluded with the CONNECT message, or can be initiated by the CONNECT message.

The bearer channels or logical channels, that is to say the channels for transmitting useful information, are opened directly between the endpoints A and B, whereas the signaling connections have all been set up to the proxy function Proxy, and messages are forwarded from this proxy function Proxy to the actual destinations, endpoint A and endpoint B.

In the sequence of events shown in FIG. 2 for implementing a hunting-group line group, the message H.225 SETUP is first forwarded to the endpoint B by the proxy function. The endpoint B acknowledges to the proxy function Proxy that dialing is complete with a message CallProc and that an incoming call has been recognized with a message Alerting. The proxy function transmits these messages CallProc and Alerting to the calling endpoint A.

If, as is assumed in the embodiment, shown in FIG. 2, of a sequence of events for implementing a hunting-group line group, the call signaled by the endpoint A is not taken at the endpoint B within a defined time period, the proxy function Proxy releases the signaling connection to the endpoint B with the message release.

In light of the fact that the call offered at the endpoint B has not been accepted, the proxy function Proxy forwards the message H.225 SETUP to the endpoint C. The endpoint C acknowledges to the proxy function Proxy that dialing is complete with a message CallProc and that an incoming call has been recognized with a message Alerting. However, the proxy function does not now transmit these messages CallProc and Alerting to the calling endpoint A, as this has already been done previously on account of the corresponding messages from the endpoint B.

If, as is assumed in the embodiment, shown in FIG. 2, of a sequence of events for implementing a hunting-group line group, a subscriber or an automated device at the endpoint C wants to take the call signaled by the endpoint A, a response message CONNECT (as per ITU-T H.225) is transmitted to the endpoint A from the endpoint C via the proxy function Proxy. A procedure for opening logical channels between the endpoints A and C is then initiated. In this case, the opening of logical channels can either be prepared by the actual SETUP message and concluded with the CONNECT message, or can be initiated by the CONNECT message.

The logical channels or bearer channels, that is to say the channels for transmitting useful information, are opened directly between the endpoints A and C, whereas the signaling connections have all been set up to the proxy function Proxy, and messages are forwarded from this proxy function Proxy to the actual destinations, endpoint A and endpoint C.

The implementations described for the line group facility are in this case independent of whether, as in the embodiments, a gatekeeper is used for routing, for example by means of address conversion.

We claim:

1. A method of implementing a line group function in a communications network based on ITU-T Standard H.323, whereby a calling endpoint calls a group address to prompt a connection to be set up to one of a plurality of group endpoints in a line group, which comprises:

converting an alias address for a line group into a group transport address for a proxy function, and transmitting a connection setup message from a calling endpoint to the proxy function using the group transport address;

transmitting a connection setup message from the proxy function to group endpoints in the line group using transport addresses known to the proxy function;

transmitting a response message from a responding group endpoint to the proxy function, and subsequently transmitting the address of the responding group endpoint to the calling endpoint, and transmitting the address of the calling endpoint to the responding group endpoint by the proxy function; and setting up a connection between the calling endpoint and the responding group endpoint using the addresses of the calling endpoint and the responding group endpoint.

2. The method according to claim 1, which comprises signaling with the proxy function to the calling endpoint that a connection setup message is being transmitted to the group endpoints.

3. The method according to claim 1, which comprises simultaneously transmitting with the proxy function a connection setup message to all group endpoints and transmitting to the calling endpoint the address of the group endpoint from which the proxy function receives a first response message.

4. The method according to claim 1, which comprises transmitting with the proxy function a connection setup message to one of the group endpoints and, if no response message has been transmitted to the proxy function from the one group endpoint within a predetermined time period, transmitting, with the proxy function, a connection setup message to another of the group endpoints until one of the group endpoints transmits a response message.

5. The method according to claim 4, which comprises defining, with the proxy function, a sequence in which connection setup messages are to be transmitted to the individual group endpoints on the basis of a regulation for automatic call distribution.

6. The method according to claim 4, wherein one of the group endpoints is a device for recording messages, and the step of transmitting a connection setup message with the proxy function comprises transmitting the connection setup message to the device for recording messages last.

* * * * *